US012543657B2

United States Patent
Brocke et al.

(10) Patent No.: US 12,543,657 B2
(45) Date of Patent: Feb. 10, 2026

(54) METHOD FOR ASCERTAINING THE COMPACTION STATE OF SILAGE STORED IN A FLAT SILO

(71) Applicant: DEERE & COMPANY, Moline, IL (US)

(72) Inventors: Stefan Brocke, Mannheim (DE); Norbert Fritz, Ilvesheim (DE); Florian Schott, Einhausen (DE)

(73) Assignee: Deere & Company, Moline, IL (US)

( * ) Notice: Subject to any disclaimer, the term of this patent is extended or adjusted under 35 U.S.C. 154(b) by 370 days.

(21) Appl. No.: 18/323,737

(22) Filed: May 25, 2023

(65) Prior Publication Data

US 2023/0389481 A1 Dec. 7, 2023

(30) Foreign Application Priority Data

Jun. 7, 2022 (DE) .......................... 102022114289.2

(51) Int. Cl.
*A01F 25/18* (2006.01)
*B65D 90/48* (2006.01)

(52) U.S. Cl.
CPC .............. *A01F 25/18* (2013.01); *B65D 90/48* (2013.01)

(58) Field of Classification Search
CPC ....................................... A01F 25/18
USPC .......................................... 73/818
See application file for complete search history.

(56) References Cited

U.S. PATENT DOCUMENTS

| 10,617,054 B2 | 4/2020 | Gresch et al. |
| 2013/0177670 A1* | 7/2013 | Steckel ................. A01D 93/00 56/10.8 |
| 2020/0250899 A1* | 8/2020 | Sakakibara ........... B60T 8/1725 |

FOREIGN PATENT DOCUMENTS

| DE | 102019201743 A1 | 8/2020 |
| EP | 3895520 A1 | 10/2021 |
| EP | 3895521 B1 | 3/2023 |

(Continued)

OTHER PUBLICATIONS

Li et al. "Analysis of soil compaction and tire mobility with finite element method." Proceedings of the institution of mechanical engineers, part k: Journal of multi-body dynamics 227.3 (2013): 275-291. (Year: 2013).*

(Continued)

*Primary Examiner* — Walter L Lindsay, Jr.
*Assistant Examiner* — Philip T Fadul
(74) *Attorney, Agent, or Firm* — Taft Stettinius & Hollister LLP; Stephen F. Rost

(57) ABSTRACT

A method for ascertaining a compaction state of silage stored in a flat silo, in which a work vehicle used for compacting the silage has inflated tires on at least one vehicle axle, includes in a first step, via an acceleration sensor, one or more of a normal and a tangential acceleration occurring in a tire bead is detected and wirelessly transmitted in the form of sensor data corresponding thereto to a processor unit, in a second step, starting from the transferred sensor data from the processor unit, the deformations of the tire casing occurring in each case during the rolling of the tire in an entry point and an exit point are ascertained and compared to one another, and in a third step, based on the comparison, a compression behavior and in turn therefrom the compaction state of the silage is determined by the processor unit.

16 Claims, 2 Drawing Sheets

(56) References Cited

FOREIGN PATENT DOCUMENTS

EP          4144206  A1     3/2023

OTHER PUBLICATIONS

European Search Report issued in application No. 23172524.3, dated Oct. 24, 2023, 5 pages.

\* cited by examiner

METHOD FOR ASCERTAINING THE COMPACTION STATE OF SILAGE STORED IN A FLAT SILO

CROSS-REFERENCE TO RELATED APPLICATIONS

This application claims priority to German Patent Application No. 102022114289.2, filed Jun. 7, 2022, which is hereby incorporated by reference.

FIELD OF THE DISCLOSURE

The disclosure relates to a method for ascertaining the compaction state of silage stored in a flat silo.

BACKGROUND

Silage, which is produced from cuttings, such as grass, corn, clover, alfalfa, broad beans, or grains by fermentation (lactic acid fermentation) is often used for animal feed. For this purpose, the previously chopped cuttings are introduced layer by layer into flat silos and compacted. This is typically carried out by means of an agricultural tractor, which is equipped with a front loader or a pusher blade to distribute the cuttings.

SUMMARY

The compaction state of cuttings in a flat silo is significant for the quality of the silage, because it decisively influences the course of the fermentation process.

It is therefore the object to specify a method of the type mentioned at the outset which permits reliable assessment of the compaction state of the cuttings to be silaged in a flat silo.

This object is achieved by a method having the features of one or more of the following embodiments.

In the method according to the disclosure for ascertaining the compaction state of silage stored in a flat silo, it is provided that a work vehicle used for compacting the silage has inflated tires on at least one vehicle axle, wherein: in a first step, via an acceleration sensor, a normal and/or tangential acceleration occurring in a tire bead is detected and wirelessly transmitted in the form of sensor data corresponding thereto to a processor unit; in a second step, starting from the transferred sensor data from the processor unit, the deformations of the tire casing occurring in each case during the rolling of the tire in an entry point and an exit point are ascertained and compared to one another; and in a third step, based on the comparison, a compression behavior and in turn therefrom the compaction state of the silage is determined by the processor unit.

The method makes use of the finding that the compression behavior of the silage observed under the load of the work vehicle has significant influence on the deformation of the tire bead occurring in the entry area and exit area along the path during the rolling of the tire, so that its evaluation permits a reliable determination of the extent of the compactibility and thus vice versa of the current compaction state of the silage. The greater the deviation between the deformations observed on the entry and exit side, the more strongly the silage may be compressed and thus compacted in general.

Either the work vehicle itself (this is usually an agricultural tractor) or a work tool attached thereon in the form of a silo roller is used to compact the silage in the flat silo. The items of information obtained with respect to the compaction state can be used, inter alia, for active assistance of the compaction process, for example, by outputting corresponding audiovisual driving instructions to a driver of the work vehicle via a user interface located in the work vehicle.

Advantageous refinements of the method according to the disclosure are disclosed herein.

The compaction state can be ascertained from a prediction model stored in the processor unit, wherein this is parameterized as a function of one or more auxiliary variables. The auxiliary variables are, for example, items of information with respect to a residual moisture content, a cutting length, and/or a composition of the silage or the cuttings to be silaged. Because the above-mentioned factors have decisive influence on the compactibility or compressibility of the cuttings, the incorporation thereof into the prediction model can lead to more accurate results with respect to the assessment of the respective compaction state.

The residual moisture content can be ascertained in the context of a preceding work step, for example during the harvesting of the cuttings via a field chopper. For this purpose, the field chopper is equipped with a corresponding measuring device for analyzing a crop flow passing through a discharge tube during unloading. For example, such a measuring device is offered by John Deere under the name "HarvestLab 3000".

The cutting length results here from the operating settings of the field chopper, in contrast, the composition of the cuttings can be communicated to the processor unit on the part of the user via the user interface located in the work vehicle. The plant type (for example grass, corn, clover, alfalfa, field beans, or grains) is primarily significant with respect to the question of the composition of the cuttings.

The prediction model is trained beforehand based on empirically performed test and measurement series and according to the preceding auxiliary variables establishes a clear correlation between the measured variable represented by the sensor data of the acceleration sensor, on the one hand, and the respective compaction state of the silage, on the other hand. Moreover, the use of corresponding AI methods (AI—artificial intelligence) suggests itself for improving the prediction horizon.

The prediction model can be parameterized as a function of a tire type or model, a tire filling pressure, and/or an ambient temperature.

The relevant parameters can be manually detected via the user interface with regard to the specification of tire type or model or sensorially detected in the case of the tire filling pressure and/or the ambient temperature. The pressure and/or temperature sensor required for this purpose can be integrated jointly with the acceleration sensor in a measurement model, which is embedded in a tire casing and is supplied with electrical energy via a movement-induced generator or the like. Sensor data are transferred wirelessly and synchronously to the processor unit, so that their chronological coincidence is ensured.

Furthermore, there is the possibility that the ascertained compaction state of the silage is cartographically located by the processor unit by linking to GPS-based items of ascertained position information and saved as a combined data set. The GPS-based ascertainment of the items of position information is carried out, for example, via a conventional navigation system. This can be part of the work vehicle or of a mobile terminal (for example a mobile telephone), which communicates wirelessly with the processor unit via a Wi-Fi connection.

There are now various possibilities with respect to the utilization of the items of information obtained for the compaction state of the silage. On the one hand, these can be output audio-visually in real time via the user interface, on the other hand, they can also be transferred wirelessly to a central data server for the purposes of documentation. In the latter case, these are provided at the same time by the processor unit with a time stamp for comprehensible assessment of the course of the fermentation process.

The above and other features will become apparent from the following detailed description and accompanying drawings.

BRIEF DESCRIPTION OF THE DRAWINGS

The method according to the disclosure for ascertaining the compaction state of silage stored in the flat silo is described in more detail hereinafter based on the appended drawings. Here, identical reference signs refer to corresponding components or components which are of comparable function. In the figures.

DETAILED DESCRIPTION

The embodiments or implementations disclosed in the above drawings and the following detailed description are not intended to be exhaustive or to limit the present disclosure to these embodiments or implementations.

Figure 1:
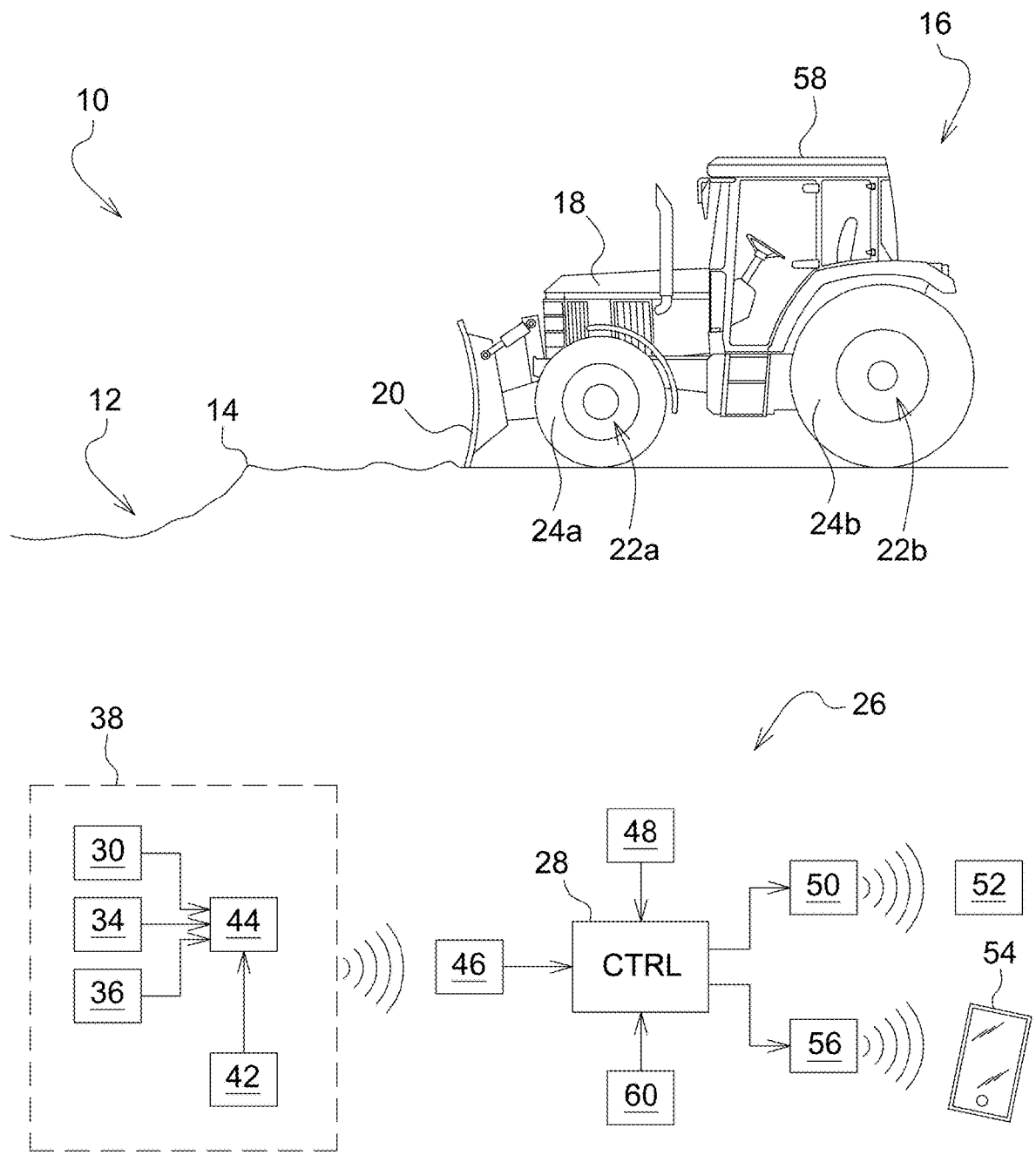
FIG. 1 shows an arrangement located in an agricultural tractor for executing the method according to the disclosure for ascertaining the compaction state of silage stored in a flat silo.

FIG. 1 shows an arrangement for executing the method according to the disclosure for ascertaining the compaction state of silage stored in a flat silo.

The silage 12 located in the flat silo 10 is produced in this case from cuttings 14, such as grass, corn, clover, alfalfa, field beans, or grains, by fermentation (lactic acid fermentation). For this purpose, the previously chopped cuttings 14 are introduced layer by layer into the flat silo 10 via a work vehicle 16 and compacted. This process is carried out in the present case via an agricultural tractor 18, to which a pusher blade 20 is attached to distribute the cuttings 14.

The agricultural tractor 18 has inflated tires 24a, 24b both on a front axle 22a and on a rear axle 22b, which compress the cuttings 14 to be silaged as they are driven over under the weight of the agricultural tractor 18 and accordingly compact them at the same time. In addition, for this purpose a work tool designed as a silo roller (not shown) can also be attached to the agricultural tractor 18.

Figure 2:
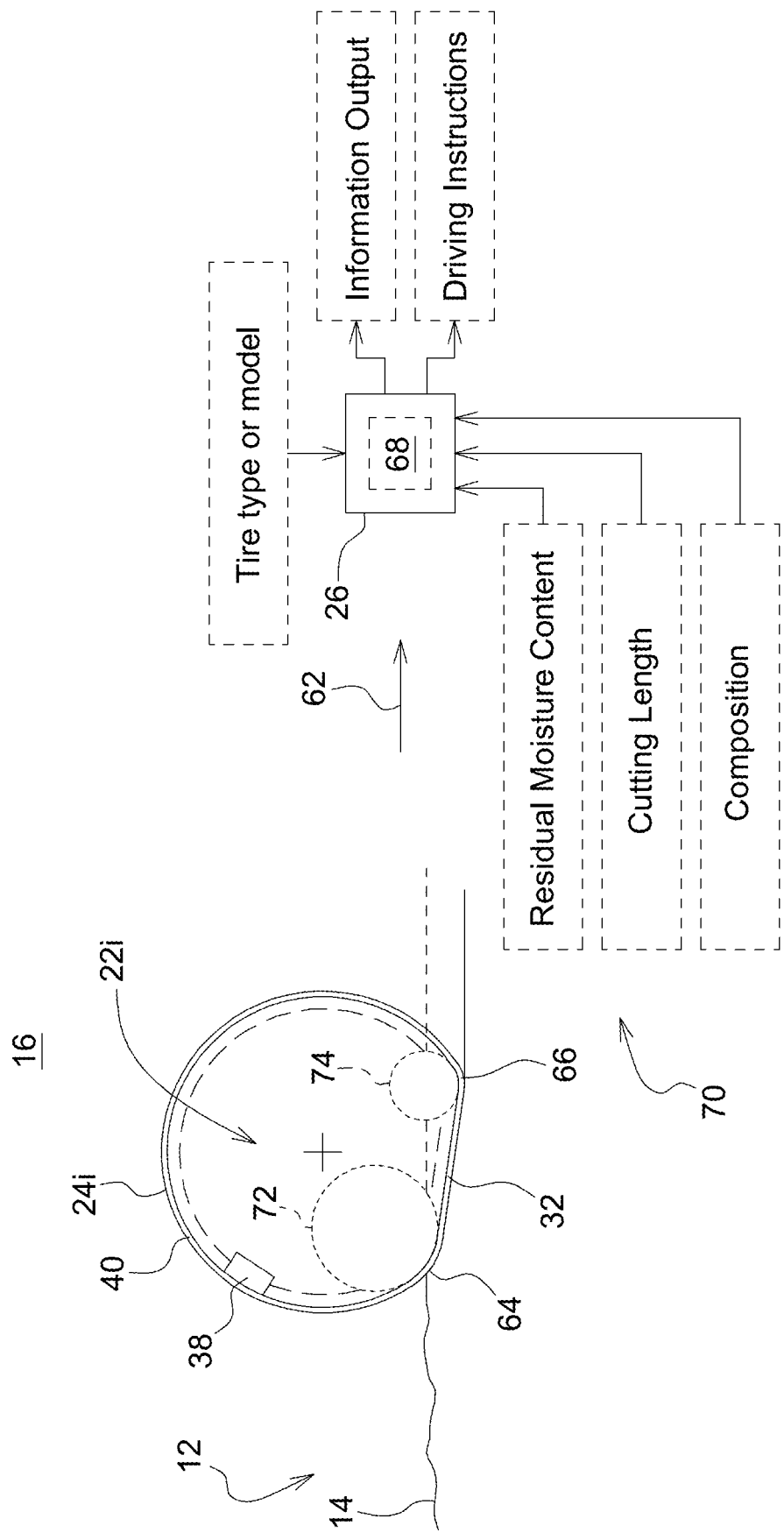
FIG. 2 shows an exemplary embodiment of the method according to the disclosure illustrated as a block diagram.

According to FIG. 1, the arrangement 26 housed in the agricultural tractor 18 comprises a processor unit 28 and an acceleration sensor 30, which is associated with at least one of the tires 24i (i=a or b) and which detects a normal and/or tangential acceleration occurring in a tire bead 32 (see FIG. 2 in this regard).

The acceleration sensor 30 is integrated together with a pressure and/or temperature sensor 34, 36 for sensorially detecting a tire filling pressure and/or an ambient temperature in a measurement module 38, which is embedded in the tire casing 40 and is supplied with electrical energy via a movement-induced generator 42. Sensor data are transferred wirelessly and synchronously via a transceiver 44 to the processor unit 28 or a radio interface 46 connected thereto. To increase the data quality, both the tires 24a of the front axle 22a and also the tires 24b of the rear axles 22b can each be equipped with a separate measurement module 38, wherein the processor unit 28 evaluates the sensor data of the tires 24a of the front axle 22a in case of a forward travel and evaluates the tires 24b of the rear axle 22b in case of a reverse travel for the purpose of ascertaining the compaction state of the silage 12.

The processor unit 28 is also connected to a navigation system 48 and is wirelessly connected to a central data server 52 via a data interface 50. The navigation system 48 is part of the agricultural tractor 18 or of a mobile terminal 54 (for example a mobile telephone), which communicates wirelessly with the processor unit 28 via a Wi-Fi connection is established using a further data interface 56.

On the output side, a user interface 60 located in a driver cab 58 of the agricultural tractor 18 may be activated on the part of the processor unit 28.

FIG. 2 shows an exemplary embodiment of the method according to the disclosure illustrated as a block diagram.

In this case, initially, in a first step, the normal and/or tangential acceleration occurring in the tire bead 32 including the tire filling pressure and/or the associated ambient temperature are detected via the measurement module 38 and are transferred in the form of the sensor data 62 corresponding thereto wirelessly via the transceiver 44 and the radio interface 46 to the processor unit 28.

Starting from the transferred sensor data 62, in a second step, the deformations of the tire casing 40 occurring in each case during the rolling of the tire 24i in an entry point and an exit point 64, 66 are ascertained and compared to one another, wherein, in a third step, a compression behavior and in turn therefrom the compaction state of the silage 12 is determined based on the comparison by the processor unit 28.

The compaction state is ascertained from a prediction model 68 stored in the processor unit 28, wherein this is parameterized as a function of one or more auxiliary variables 70. The auxiliary variables 70 are items of information with respect to a residual moisture content, a cutting length, and/or a composition of the silage 12 or the cuttings 14 to be silaged.

The residual moisture content is ascertained in the context of a preceding work step, for example during the harvesting of the cuttings 14 via a field chopper. For this purpose, the field chopper is equipped with the corresponding measuring device for analyzing a crop flow passing through a discharge tube during unloading. Such a measuring device is offered by John Deere under the name "HarvestLab 3000".

The cutting length results here from the operating settings of the field chopper, in contrast, the composition of the cuttings 14 is communicated to the processor unit 28 on the part of a user via the user interface 60 located in the agricultural tractor 18. Primarily the type of plant (for example grass, corn, clover, alfalfa, field beans, or grains) is important with respect to the question of the composition of the cuttings 14.

In addition, the prediction models 68 is parameterized as a function of a tire type or model and of the tire filling pressure and/or the ambient temperature, wherein the last two parameters result from the sensor data 62 transferred from the measurement module 38. The selection of the tire type or model used is carried out manually via the user interface 60.

The prediction model 68 is trained beforehand based on empirically performed test and measurement series and, according to the auxiliary variables 70, establishes a clear correlation between the measured variable represented by the sensor data 62 of the acceleration sensor 30, on the one hand, and the respective compaction state of the silage 12, on the other hand.

The method makes use of the finding that the compression behavior of the silage 12 observed under the load of the agricultural tractor 18 has significant influence on the deformation of the tire bead 32 occurring in the entry and exit area 64, 66 along the path during the rolling of the tire 24i, so that its evaluation permits a reliable determination of the extent of the compactibility and thus vice versa of the current compaction state of the silage 12. The greater the deviation between the deformations observed on the entry and exit sides, the more strongly in general the silage 12 may be compressed and thus compacted. The deformation occurring when driving over the cuttings 14, which has the profile of a rounding of the tire bead 32 on the entry or exit side, is indicated in FIG. 2 by respective circles 72, 74 of corresponding diameter.

In addition, the ascertained compaction state of the silage 12 is cartographically located by the processor unit 28 by linking to GPS-based ascertained items of position information and stored as a combined data set in a work memory of the processor unit 28. The GPS-based ascertainment of the items of position information is carried out via the navigation system 48.

There are now various possibilities with respect to the utilization of the items of information obtained for the compaction state of the silage 12. On the one hand, these can be output audio-visually in real time via the user interface 60, on the other hand, they may also be transferred wirelessly to the central data server 52 for the purposes of documentation. In the latter case, they are provided at the same time with a timestamp by the processor unit 28 for comprehensible assessment of the course of the fermentation process.

Furthermore, the items of information obtained with respect to the compaction state are used for active assistance of the compaction process. This is carried out by outputting corresponding audio-visual driving instructions to a driver of the agricultural tractor 18 via the user interface 60.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for ascertaining a compaction state of silage stored in a flat silo, in which a work vehicle used for compacting the silage has inflated tires on at least one vehicle axle, comprising:
   in a first step, via an acceleration sensor, one or more of a normal and a tangential acceleration occurring in a tire bead is detected and wirelessly transmitted in the form of sensor data corresponding thereto to a processor unit;
   in a second step, starting from the transferred sensor data from the processor unit, the deformations of a tire casing occurring in each case during the rolling of the tire in an entry point and an exit point are ascertained and compared to one another; and
   in a third step, based on the comparison, a compression behavior and in turn therefrom the compaction state of the silage is determined by the processor unit.

2. The method of claim 1, wherein the compaction state is ascertained from a prediction model stored in the processor unit, wherein this is parameterized as a function of one or more auxiliary variables.

3. The method of claim 2, wherein the prediction model is parameterized as a function of one or more of a tire type or model, a tire filling pressure, and an ambient temperature.

4. The method of claim 2, wherein the prediction model is parameterized as a function of a tire type or model, a tire filling pressure, and an ambient temperature.

5. The method of claim 1, wherein the ascertained compaction state of the silage is cartographically located by the processor unit by linking to GPS-based ascertained items of position information and stored as a combined data set.

6. The method of claim 1, wherein the items of information obtained for the compaction state of the silage are output audio-visually via a user interface.

7. The method of claim 1, wherein the items of information obtained for the compaction state of the silage are transferred wirelessly to a central data server.

8. The method of claim 1, wherein the items of information obtained for the compaction state of the silage are output audio-visually via a user interface and transferred wirelessly to a central data server.

9. A method of determining a compaction state of silage stored in a flat silo, comprising:

operating a work vehicle having at least one tire on an axle;

detecting, via an acceleration sensor, sensor data corresponding to one or more of a normal acceleration and a tangential acceleration in a tire bead of the at least one tire;

transmitting the sensor data to a processor unit;

determining, via the processor unit, a deformation of a tire casing occurring during rolling of the at least one tire at an entry point and an exit point of the tire casing;

comparing, via the processor unit, the deformation of the tire casing at the entry point to the deformation of the tire casing at the exit point; and determining, by the processor unit, a compression behavior and the compaction state of the silage based on the comparison of the deformation at the entry point and the deformation at the exit point.

10. The method of claim 9, further comprising determining the compaction state by using a prediction model stored in the processor unit.

11. The method of claim 10, wherein the prediction model is parameterized as a function of one or more of a tire type, tire model, a tire filling pressure, and an ambient temperature.

12. The method of claim 10, wherein the prediction model is parameterized as a function of a tire type, tire model, a tire filling pressure, and an ambient temperature.

13. The method of claim 9, further comprising cartographically locating, by the processor unit, the determined compaction state of the silage by linking to GPS-based items of position information.

14. The method of claim 13, further comprising audio-visually outputting the items of position information via a user interface.

15. The method of claim 13, further comprising transferring the items of position information to a central data server.

16. The method of claim 13, wherein the items of position information obtained for the compaction state of the silage are output audio-visually via a user interface and transferred wirelessly to a central data server.

* * * * *